United States Patent
Oberg

(10) Patent No.: US 10,529,376 B1
(45) Date of Patent: Jan. 7, 2020

(54) TWO DIMENSIONAL MAGNETIC RECORDING (TDMR) OFF-TRACK PERFORMANCE IMPROVEMENT

(71) Applicant: Marvell International Ltd., Hamilton (BM)

(72) Inventor: Mats Oberg, San Jose, CA (US)

(73) Assignee: MARVEL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 16/182,160

(22) Filed: Nov. 6, 2018

Related U.S. Application Data

(60) Provisional application No. 62/617,025, filed on Jan. 12, 2018.

(51) Int. Cl.
G11B 5/09 (2006.01)
G11B 21/10 (2006.01)
G11B 5/012 (2006.01)

(52) U.S. Cl.
CPC .......... G11B 21/106 (2013.01); G11B 5/012 (2013.01); G11B 5/09 (2013.01)

(58) Field of Classification Search
None
See application file for complete search history.

(56) References Cited

U.S. PATENT DOCUMENTS

| | | | | |
|---|---|---|---|---|
| 4,542,428 A | * | 9/1985 | Yanagi | G11B 5/59655 360/135 |
| 8,947,806 B1 | * | 2/2015 | Oenning | G11B 5/012 360/39 |
| 9,007,707 B1 | * | 4/2015 | Lu | G11B 5/012 360/22 |
| 9,036,304 B1 | * | 5/2015 | Galbraith | G11B 5/4886 360/246.6 |
| 9,082,418 B2 | * | 7/2015 | Ong | G11B 5/012 |
| 9,105,277 B1 | * | 8/2015 | Harada | G11B 5/012 |
| 9,195,860 B1 | * | 11/2015 | Patapoutian | G06G 7/16 |
| 2006/0107092 A1 | * | 5/2006 | Lum | G11B 20/1879 714/6.1 |
| 2015/0380048 A1 | * | 12/2015 | Oberg | G11B 20/10037 360/32 |

* cited by examiner

*Primary Examiner* — Peter Vincent Agustin

(57) ABSTRACT

In a two-dimensional magnetic recording (TDMR) system, a first finite impulse response (FIR) filter processes data read from a track of a magnetic medium by a first head using first filter tap values determined a priori independently of a second head. A second FIR filter processes data read from a track by the second head using second filter tap values determined a priori independently of the first head. An off-track detector detects whether one or more of the first and second heads is off of the tracks being read. A gain controller controls gains for the first and second FIR filters based on whether one or more of the first and second heads is off of the tracks being read.

20 Claims, 6 Drawing Sheets

TWO DIMENSIONAL MAGNETIC RECORDING (TDMR) OFF-TRACK PERFORMANCE IMPROVEMENT

CROSS-REFERENCE TO RELATED APPLICATIONS

This application claims the benefit of U.S. Provisional Application No. 62/617,025, filed on Jan. 12, 2018. The entire disclosure of the application referenced above is incorporated herein by reference.

FIELD

The present disclosure relates generally to hard disk drives (HDD's) and more particularly to improving off-track performance of two dimensional magnetic recording (TDMR) in HDD's.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Two-dimensional magnetic recording (TDMR) system allows hard drive manufacturers to increase areal density of hard disk drive (HDD) platters by making tracks narrower and track pitch smaller than they are today. While it is possible to minimize a writer (a portion of an HDD's head that writes data), reading data can be challenging as tracks become narrower. For example, as tracks become narrower, the tracks start to affect each other causing inter-track interference (ITI), which makes it increasingly difficult for readers (portions of the HDD's heads that read data) to perform read operations. To mitigate ITI resulting from very narrow tracks, the TDMR system uses an array of heads to read data from either one or several neighboring tracks. This improves the signal-to-noise ratio of signals provided to an HDD controller (HDC). Using several readers allows the HDC to determine the correct data based on inputs received from several locations on the HDD's platters.

SUMMARY

A two-dimensional magnetic recording (TDMR) system includes a first read head and a second read head. Each of the first read head and the second read head is configured to read data from one or more tracks of a magnetic medium. The TDMR system comprises a first finite impulse response (FIR) filter, a second FIR filter, an off-track detector, and a gain controller. The first finite FIR filter is configured to process data read from one of the one or more tracks of the magnetic medium by the first read head using first filter tap values. The first filter tap values are determined a priori independently of the second read head and based on the first read head being positioned on one of the one or more tracks of the magnetic medium. The second FIR filter is configured to process data read from one of the one or more tracks of the magnetic medium by the second read head using second filter tap values. The second filter tap values are determined a priori independently of the first read head and based on the second read head being positioned on one of the one or more tracks of the magnetic medium. The off-track detector is configured to detect whether one or more of the first read head and the second read head is off one of the one or more tracks being read. The gain controller is configured to control a first gain and a second gain respectively associated with the first FIR filter and the second FIR filter based on whether one or more of the first read head and the second read head is off one of the one or more tracks being read.

In other features, in response to the first read head being more off one of the one or more tracks being read than the second read head, the gain controller is configured to decrease the first gain associated with the first FIR filter relative to the second gain associated with the second FIR filter; increase the second gain associated with the second FIR filter relative to the first gain associated with the first FIR filter; or decrease the first gain associated with the first FIR filter and increase the second gain associated with the second FIR filter.

In other features, the gain controller is configured to not change the first gain and the second gain respectively associated with the first FIR filter and the second FIR filter in response to each of the first read head and the second read head being on one of the one or more tracks being read or being equally off one of the one or more tracks being read.

In other features, the gain controller is configured to initialize the first gain and the second gain respectively associated with the first FIR filter and the second FIR filter to be equal. The gain controller is further configured to not change the first gain and the second gain respectively associated with the first FIR filter and the second FIR filter in response to each of the first read head and the second read head being on one of the one or more tracks being read or being equally off one of the one or more tracks being read.

In other features, the off-track detector is configured to detect whether one or more of the first read head and the second read head is off or on one of the one or more tracks being read based on ratios of amplitudes of signals received from the first read head and the second read head.

In other features, the TDMR system further comprises an adder, a reconstruction module, and a subtractor. The adder is configured to generate a sum of outputs of the first FIR filter and the second FIR filter. The reconstruction module is configured to generate a reconstructed signal representing data read from one of the one or more tracks. The subtractor is configured to subtract the reconstructed signal from the sum and to generate an error signal. The gain controller is configured to control the first gain and the second gain respectively associated with the first FIR filter and the second FIR filter based on correlations between the error signal and the outputs of the first FIR filter and the second FIR filter.

In other features, the gain controller is configured to decrease the first gain associated with the first FIR filter in response to the error signal correlating with the output of the first FIR filter and not correlating with the output of the second FIR filter. The gain controller is further configured to decrease the second gain associated with the second FIR filter in response to the error signal correlating with the output of the second FIR filter and not correlating with the output of the first FIR filter.

In other features, the TDMR system further comprises a first adder, a reconstruction module, a second adder, a subtractor, and an adapting module. The first adder is configured to generate a sum of outputs of the first FIR filter and the second FIR filter. The reconstruction module is configured to detect data in the sum and to generate a reconstructed signal representing data read from one of the one or more tracks based on the detected data and a target polynomial. The second adder is configured to add the outputs of the first FIR filter and the second FIR filter respectively multiplied by a third gain and a fourth gain and to generate an output. The subtractor is configured to subtract the reconstructed signal from the output of the second adder and to generate an error signal. The adapting module is configured to adapt the first filter tap values of the first FIR filter and the second filter tap values of the second FIR filter based on the error signal.

In other features, the adapting module is configured to not adapt the first filter tap values of the first FIR filter and the second filter tap values of the second FIR filter from the start of a preamble of a data sector of one of the one or more tracks being read until a predetermined time period elapses following the end of the preamble. The adapting module is further configured to start adapting the first filter tap values of the first FIR filter and the second filter tap values of the second FIR filter based on the error signal after the predetermined time period elapses following the end of the preamble of the data sector. The predetermined time period is programmable or is based on detecting when the third gain and the fourth gain stabilize.

In other features, the gain controller is configured to adapt the first gain, the second gain, the third gain, and the fourth gain during the preamble. The gain controller is further configured to stop adapting the third gain and the fourth gain after the end of the preamble. The gain controller is further configured to continue adapting the first gain and the second gain after the first filter tap values of the first FIR filter and the second filter tap values of the second FIR filter are adapted.

In still other features, a method is disclosed for controlling a first finite impulse response (FIR) filter and a second FIR filter in a two-dimensional magnetic recording (TDMR) system. The TDMR system includes a first read head and a second read head. Each of the first read head and the second read head is configured to read data from one or more tracks of a magnetic medium. The method comprises processing, using the first FIR filter, data read from one of the one or more tracks of the magnetic medium by the first read head using first filter tap values. The first filter tap values are determined a priori independently of the second read head and based on the first read head being positioned on one of the one or more tracks of the magnetic medium. The method further comprises processing, using the second FIR filter, data read from one of the one or more tracks of the magnetic medium by the second read head using second filter tap values. The second filter tap values are determined a priori independently of the first read head and based on the second read head being positioned on one of the one or more tracks of the magnetic medium. The method further comprises detecting whether one or more of the first read head and the second read head is off one of the one or more tracks being read. The method further comprises controlling a first gain and a second gain respectively associated with the first FIR filter and the second FIR filter based on whether one or more of the first read head and the second read head is off one of the one or more tracks being read.

In other features, in response to the first read head being more off one of the one or more tracks being read than the second read head, the method further comprises decreasing the first gain associated with the first FIR filter relative to the second gain associated with the second FIR filter; increasing the second gain associated with the second FIR filter relative to the first gain associated with the first FIR filter; or decreasing the first gain associated with the first FIR filter and increasing the second gain associated with the second FIR filter.

In other features, the method further comprises not changing the first gain and the second gain respectively associated with the first FIR filter and the second FIR filter in response to each of the first read head and the second read head being on one of the one or more tracks being read or being equally off one of the one or more tracks being read.

In other features, the method further comprises initializing the first gain and the second gain respectively associated with the first FIR filter and the second FIR filter to be equal. The method further comprises not changing the first gain and the second gain respectively associated with the first FIR filter and the second FIR filter in response to each of the first read head and the second read head being on one of the one or more tracks being read or being equally off one of the one or more tracks being read.

In other features, the method further comprises detecting whether one or more of the first read head and the second read head is off or on one of the one or more tracks being read based on ratios of amplitudes of signals received from the first read head and the second read head.

In other features, the method further comprises generating a sum of outputs of the first FIR filter and the second FIR filter; generating a reconstructed signal representing data read from one of the one or more tracks; subtracting the reconstructed signal from the sum to generate an error signal; and controlling the first gain and the second gain respectively associated with the first FIR filter and the second FIR filter based on correlations between the error signal and the outputs of the first FIR filter and the second FIR filter.

In other features, the method further comprises decreasing the first gain associated with the first FIR filter in response to the error signal correlating with the output of the first FIR filter and not correlating with the output of the second FIR filter. The method further comprises decreasing the second gain associated with the second FIR filter in response to the error signal correlating with the output of the second FIR filter and not correlating with the output of the first FIR filter.

In other features, the method further comprises generating a sum of outputs of the first FIR filter and the second FIR filter; detecting data in the sum and generating a reconstructed signal representing data read from one of the one or more tracks based on the detected data and a target polynomial; adding the outputs of the first FIR filter and the second FIR filter respectively multiplied by a third gain and a fourth gain and generating an output; subtracting the reconstructed signal from the output and generating an error signal; and adapting the first filter tap values of the first FIR filter and the second filter tap values of the second FIR filter based on the error signal.

In other features, the method further comprises not adapting the first filter tap values of the first FIR filter and the second filter tap values of the second FIR filter from the start of a preamble of a data sector of one of the one or more tracks being read until a predetermined time period elapses following the end of the preamble. The method further comprises starting adapting the first filter tap values of the first FIR filter and the second filter tap values of the second FIR filter based on the error signal after the predetermined time period elapses following the end of the preamble of the data sector. The predetermined time period is programmable or is based on detecting when the third gain and the fourth gain stabilize.

In other features, the method further comprises adapting the first gain, the second gain, the third gain, and the fourth gain during the preamble; stopping adapting the third gain and the fourth gain after the end of the preamble; and continuing adapting the first gain and the second gain after the first filter tap values of the first FIR filter and the second filter tap values of the second FIR filter are adapted.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1A:
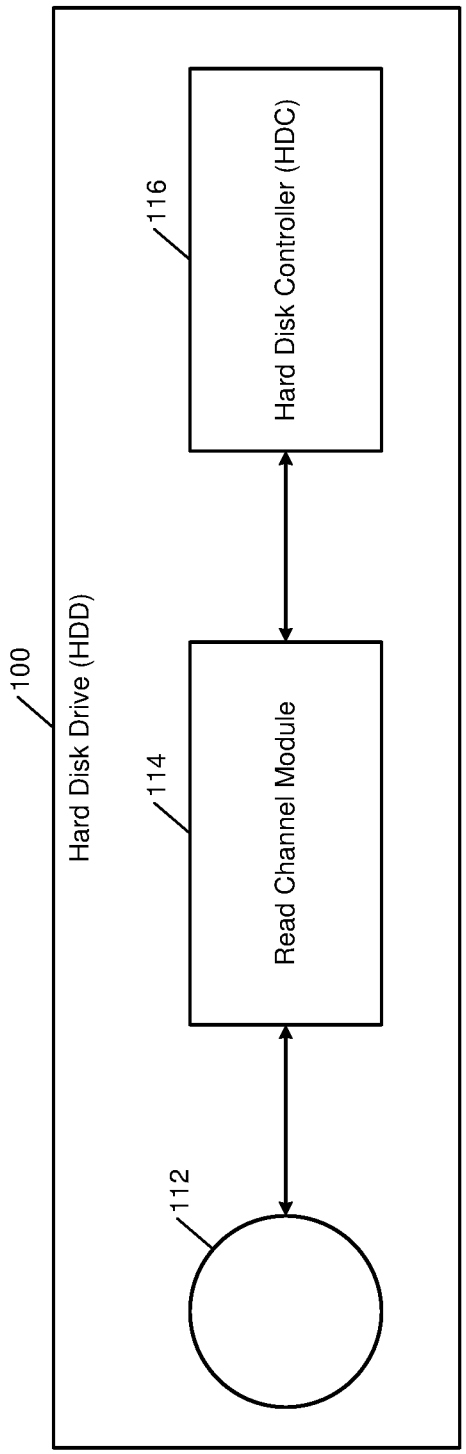
FIG. 1A shows a simplified schematic of a hard disk drive (HDD).

FIG. 1A shows a simplified schematic of a hard disk drive (HDD) 100. The HDD 100 comprises a magnetic medium 112, a read channel module 114, and a hard disk controller (HDC) 116. The read channel module 114 uses a two-dimensional magnetic recording (TDMR) system to write and read data on the magnetic medium 112 using a plurality of read/write heads (shown in FIG. 1B). The HDC 116 controls the operation of the HDD 100 and interfaces the HDD 100 to a host (not shown). The HDC 116 receives data to be written on the HDD 100 from the host. The read channel module 114 writes the data on the magnetic medium 112 using the read/write heads. The read channel module 114 reads the data from the magnetic medium 112 using the read/write heads. The HDC 116 provides the read data to the host.

Due to narrow tracks and reduced track pitch, the TDMR system is sensitive to track squeeze conditions that can occur when a write head writes data at least partially on a neighboring track during a write operation. The TDMR system is also sensitive to off-track conditions that can occur when a read head is not positioned perfectly on-track (i.e., on the track of interest) and as a result also senses data from a neighboring track.

A digital position error signal (DPES) circuit utilizing a bank of 2D equalizer coefficients optimized for different off-track can mitigate these conditions. For example, when an off-track condition occurs during a read operation, the digital PES circuit can detect the off-track condition while reading a preamble, select optimal filter tap values for 2D equalized filters based on the detected off-track condition, and load the selected filter tap values to mitigate the off-track condition.

The optimal filter tap values, however, have to be determined a priori in the factory by parking the heads off-track for each track and performing calibration for each off-track position. This optimization process takes a long time. Further, during operation, errors can occur in the off-track detection, which can result in significant performance loss.

The present disclosure proposes utilizing FIR filters optimized for a single reader (i.e., for a single read head) and applying linear weights (i.e., gains) to the outputs of the optimized FIR filters to improve performance of the read channel module as explained below in detail. Specifically, as explained below in detail, the filter taps of an FIR filter used with a head are optimized for only that head. An off-track detector is used to detect off-track conditions and to perform off-track measurements during a preamble portion of a read signal. An error signal is generated based on the off-track measurements. The error signal is utilized to adjust the gains associated with the FIR filters. Additionally, Gain Control Module 1 140 and Gain Control Module 2 142 are used to adapt the gains of gain multipliers 146, 148, 152, and 154 at the end of the preamble portion. Then after a period, that may be programmable, the adaptation of the gains for multipliers 152 and 154 is stopped. Thereafter, an adapting module is used to adapt the filter taps of the FIR filters. These and other features of the present disclosure are described below in detail.

Figure 1C:
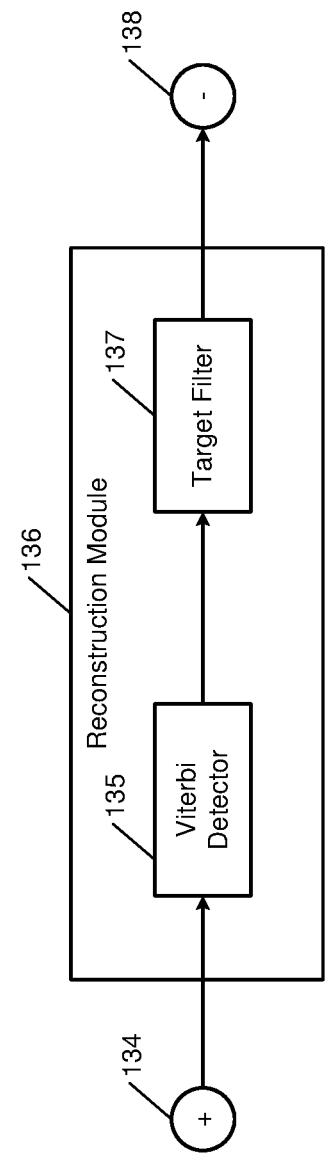
FIG. 1C shows a reconstruction module of the read channel module of FIG. 1B according to the present disclosure.
Figure 1B:
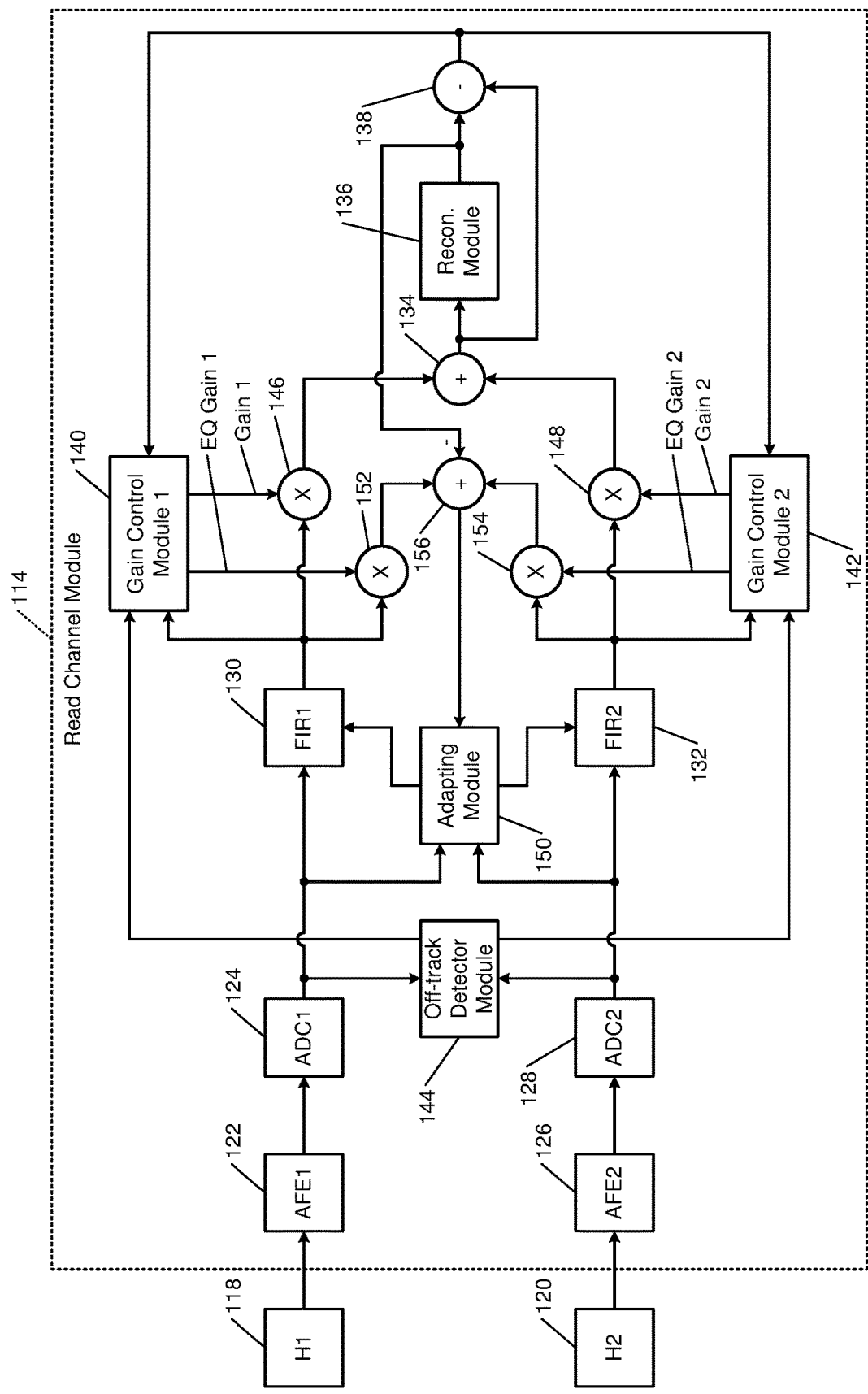
FIG. 1B shows a read channel module for the HDD of FIG. 1A according to the present disclosure.

FIG. 1B shows the read channel module 114 according to the present disclosure in detail. For example, the read channel module 114 receives data from a first head H1 118 and a second head H2 120. The read channel module 114 comprises a first analog front end module AFE1 122 that processes (e.g., filters, amplifies, etc.) the signal from the first head H1 118 and a first analog-to-digital converter module ADC1 124 that generates digital samples of the processed signal from the first AFE1 122. The read channel module 114 comprises a second analog front end module AFE2 126 that processes (e.g., filters, amplifies, etc.) the signal from the second first head H2 120 and a second analog-to-digital converter module ADC2 128 that generates digital samples of the processed signal from the second AFE2 126.

The read channel module 114 further comprises a first finite impulse response (FIR) filter FIR1 130, a second finite impulse response (FIR) filter FIR2 132, a first adder 134, a reconstruction module 136, and a subtractor 138. The sampled data from the first ADC module ADC1 124 is input to the first filter FIR1 130. The sampled data from the second ADC module ADC2 128 is input to a second filter FIR2 132. The first adder 134 adds the outputs of the first filter FIR1 130 and the second filter FIR2 132. The reconstruction module 136 generates a reconstructed signal based on a sum of the outputs of the first filter FIR1 130 and the second filter FIR2 132.

FIG. 1C shows the reconstruction module 136. The reconstruction module 136 comprises a data detector (e.g., a Viterbi detector) 135 and a target filter 137. The data detector 135 detects the data in the sum output by the first adder 134. The target filter 137 equalizes the detected data to a target polynomial. The reconstruction module 136 essentially equalizes the sum output by the first adder 134 to a target polynomial. The reconstructed signal is meant to represent a signal that would be generated if the data written to the storage medium would be passed directly through the target polynomial instead of passing through the heads, the filters, etc. Due to detection errors in the Viterbi detector, the detected data may have errors relative to the data originally written to the storage medium. Therefore, the reconstructed signal may not be ideal. The subtractor 138 generates an error signal by subtracting the reconstructed signal from the sum of the outputs of the first filter FIR1 130 and the second filter FIR2 132 output by the first adder 134.

In FIG. 1B, the read channel module 114 further comprises a first gain control module 140 and a second gain control module 142. The first and second gain control modules 140, 142 control first and second gains Gain 1 and Gain 2 respectively associated with the first and second filters FIR1 130 and FIR2 132 based on correlations between the error signal and the outputs of the first and second filters FIR1 130 and FIR2 132 as explained below.

The read channel module 114 further comprises an off-track detector module 144 that detects how well each of the first and second read heads H1 118 and H2 120 are aligned with the track being read. The off-track detector module 144 performs the detection during the preamble portion of the signals received from the first and second heads H1 118 and H2 120. The off-track detector module 144 measures amplitudes of signals from each head (e.g., amplitudes A1 and A2 of the preamble for each of the first and second heads H1 118 and H2 120). The off-track detector module 144 measures an amount by which one or more of the first and second heads H1 118 and H2 120 is off of the track being read. Based on the measured off track amount, initial gain values for gain multipliers 146, 148, 152, and 154 can be selected.

The filter taps can be generated according to the present disclosure as follows. Initially, in the factory, optimal values of the filter taps for the first filter FIR1 130 are determined based solely on the signal received from the first head H1 118 (i.e., independently of the second head H2 120) by assuming that the second head H2 120 does not exist. That is, signals from the second head H2 120 are disregarded and not considered in the optimization of the filter taps of the first filter FIR1 130. Subsequently, optimal values of the filter taps for the second filter FIR2 132 are determined based solely on the signal received from the second head H2 120 (i.e., independently of the first head H1 118) by assuming that the first head H1 118 does not exist. That is, signals from the first head H1 118 are disregarded and not considered in the optimization of the filter taps of the second filter FIR2 132. In other words, each FIR filter is individually optimized (i.e., filter tap values of each FIR filter are determined a priori) for the respective, single head (independently of the other head), with that head being on-track (i.e., on the track of interest).

Now, in operation (i.e., in use and not in the factory), suppose that the first head H1 118 is on the track of interest (i.e., on track) and that the second head H2 120 is almost on the neighboring track (i.e., off track). The off-track detector module 144 may detect that the second head H2 120 is significantly off track (e.g., by an amount greater than or equal to a predetermined threshold). In such a situation, the second gain control module 142 may reduce the gain associated with the second filter FIR2 132 down to almost zero. In some instances, additionally, the first gain control module 140 may also increase or boost the gain associated with the first filter FIR1 130.

Similarly, if the second head H2 120 is on the track of interest (i.e., on track) and the first head H1 118 is almost on the neighboring track (i.e., off track), the off-track detector module 144 may detect that the first head H1 118 is significantly off track (e.g., by an amount greater than or equal to a predetermined threshold). In such a situation, the first gain control module 140 may reduce the gain associated with the first filter FIR1 130 down to almost zero. In some instances, additionally, the second gain control module 142 may also increase or boost the gain associated with the second filter FIR2 132.

If the off-track detector module 144 detects that both heads are sufficiently on track (or if both heads are slightly but almost equally off-track), no gain adjustment is performed. This is assuming that the gain is almost equal. Assume instead that the heads were largely off-track in a previous read gate and that the gains were adjusted accordingly, and that now both heads are sufficiently on-track. In such case, the gains are adjusted to be very similar.

A gain adjustment for an FIR filter, as used herein, is a weight given by the corresponding gain control module to the output of the FIR filter. A multiplier associated with a FIR filter multiplies the output of the FIR filter by the weight. For example, a first multiplier 146 multiplies the output of the first filter FIR1 130 according to a weight (e.g., Gain 1) output by the first gain control module 140. A second multiplier 148 multiplies the output of the second filter FIR2 132 according to a weight (e.g., Gain 2) output by the second gain control module 142.

Initially, the gains of the first and second gain filters FIR1 130 and FIR2 132 can be set to be equal. If the off-track detector module 144 detects during the preamble portion of the signal that one of the heads is significantly off track, the gain associated with the FIR filter that corresponds to the head that is significantly off track can be reduced to almost zero, and optionally the gain associated with the FIR filter that corresponds to the head that is on track can be boosted or increased. This process of adjusting the gain associated with the FIR filters on the fly (i.e., in real time, in use) is fast. Further, the process of individually and independently optimizing the tap values of the FIR filters a priori (in the factory) is also considerably fast. Together, these two processes save a considerable amount of time and significantly improve the performance of the read channel module 114.

Each of the first and second gain control modules 140 and 142 receives the error signal from the subtractor 138. Additionally, each of the first and second gain control modules 140 and 142 receives the output of the first and second filters FIR1 130 and FIR2 132, respectively. Suppose that the first head H1 118 is on track and that the second head H2 120 is off track. In this situation, the first gain control module 140 will detect no correlation between the error signal and the output of the first filter FIR1 130 since the first head H1 118 is on track. In contrast, the second gain control module 142 will detect a strong correlation between the error signal and the output of the second filter FIR2 132 the second head H2 120 is off track. Accordingly, the second gain control module 142 will reduce the gain associated with the second filter FIR2 132 (i.e., Gain 2 or the weight for the second multiplier 148). The first gain control module 140 can maintain the gain associated with the first filter FIR1 130 to be the same or can increase the gain associated with the first filter FIR1 s130 (i.e., Gain 1 or the weight for the first multiplier 146).

Note the distinction between a head being off track from the head being on the neighboring track. Off-track may mean that a head is picking up significant signal from the neighboring track and a little less signal from the track of interest. If a head is on the neighboring track, then the head is completely off track.

Similarly, if the second head H2 120 is on track and the first head H1 118 is off track, the first gain control module 140 will detect a strong correlation between the error signal and the output of the first filter FIR1 130 since the first head H1 118 is off track. In contrast, the second gain control module 142 will detect no correlation between the error signal and the output of the second filter FIR2 132 since the second head H2 120 is on track. Accordingly, the first gain control module 140 will reduce the gain associated with the first filter FIR1 130 (i.e., Gain 1 or the weight for the first multiplier 146). The second gain control module 142 can maintain the gain associated with the second filter FIR2 132 to be the same or can increase the gain associated with the second filter FIR2 132 (i.e., Gain 2 or the weight for the second multiplier 148).

No gain adjustment is performed if both the first and second gain control modules 140 and 142 find equal correlation between the error signal and the outputs of the first and second filters FIR1 130 and FIR2 132. This can occur when both heads are on track or when both heads are slightly but almost equally off track.

Further, each of the first and second gain control modules 140 and 142 receives the output of the off-track detector module 144. If the output of the off-track detector module 144 indicates that the first head H1 118 is on track and that the second head H2 120 is off track), initially, the first and second gain control modules 140, 142 can initialize the gains for the first and second filters FIR1 130 and FIR2 132 to be respectively high and low, or normal and zero. This is done by setting gains of the multipliers 146, 148, 152 and 154. Based on the output of the off-track detector module 144, the gains of the multipliers 146 and 152 are initialized to same value, and gains of the multipliers 148 and 154 to the same value. Conversely, if the output of the off-track detector module 144 indicates that the second head H2 120 is on track and that the first head H1 118 is off track, initially, the first and second gain control modules 140, 142 can initialize the gains for the first and second filters FIR1 130 and FIR2 132 to be respectively low and high, or zero and normal. Again, based on the output of the off-track detector module 144, the gains of the multipliers 146 and 152 are initialized to same value, and gains of the multipliers 148 and 154 to the same value.

Note that, as explained below, the gains of the first and second filters FIR1 130 and FIR2 132 in this context are controlled via separate multipliers. The off-track detector module 144 is used to initialize the gains of the multipliers 146, 148, 152, and 154. For the initial part of adaptation after that, the first and second gain control modules 140, 142 adjust the gains of the multipliers pairwise (first and third multipliers 146,152) and (second and fourth 148, 154). After that, the first and second gain control modules 140, 142 freeze gains of the third and fourth multipliers 152 and 154. At this point, the adapting module 150 begins to adapt FIR1 and FIR2. This is explained below.

This process of setting the initial gains (via the third and fourth multipliers 152 and 154) of the first and second filters FIR1 130 and FIR2 132 based on the detection performed by the off-track detector module 144 quickly provides a coarse gain adjustments for the first and second filters FIR1 130 and FIR2 132. The coarse gain adjustments are followed by the fine gain adjustments performed based on the error signal and the analyses (i.e., correlations with the error signal) of the outputs of the first and second filters FIR1 130 and FIR2 132 as described above.

The read channel module 114 further comprises an adapting module 150, third and fourth multipliers 152 and 154, and a second adder 156. The third and fourth multipliers 152 and 154 respectively multiply the outputs of the first and second filters FIR1 130 and FIR2 132 with respective equalizer or EQ gains (EQ Gain 1 and EQ Gain 2). The equalizer gains may be the same as the weights initially assigned to the first and second multipliers 146 and 148 (Gain 1 and Gain 2). The first and second gain control modules 140 and 142 may calculate the gains for each path as G1=A1/(A1+A2) and G2=A2/(A1+A2), or by some other formula. Accordingly, the first and second gain control modules 140 and 142 set the gains of the multipliers 146, 148, 152, and 154 as shown in FIG. 1B as EQ Gain 1=Gain 1=G1, and EQ Gain 2=Gain 2=G2.

The outputs of the first and second filters FIR1 130 and FIR2 132, after being multiplied by the respective equalizer gains, are added by the second adder 156. The second adder 156 subtracts the reconstructed signal from the sum produced by the second adder 156 to generate a second error signal. The adapting module 150 adapts the filter taps of the first and second filters FIR1 130 and FIR2 132 based on the second error signal (i.e., the output of the second adder 156).

During the initial portion of a data sector (during a preamble of a data sector read by the first and second heads H1 118 and H2 120 plus a predetermined period following the preamble), the first and second gain control modules 140 and 142 adapt the gains and update the multipliers 146, 152, 148, 154, and the FIR adaptation (i.e., the adaptation of the tap value of the first and second filters FIR1 130 and FIR2 132) is frozen. Then after the predetermined period following the preamble (by then the gains stabilize), the adaptation of the third and fourth multipliers 152 and 154 is frozen, and the adaptation of the tap values of the first and second filters FIR1 130 and FIR2 132 starts.

The adapting module 150 starts adapting the filter tap values after a programmable predetermined time period elapses following the end of the preamble of the data sector (e.g., after a programmable number of clocks following a sync mark). Thereafter, the first and second gain control modules 140 and 142 continue to adapt the gains of the first and second multipliers 146 and 148 (Gain 1 and Gain 2) as explained above.

Since the adapting module 150 does not receive any feedback from the first and second multipliers 146 and 148, there is no coupling between the gains Gain 1 and Gain 2 of the first and second multipliers 146 and 148 and the gain control loops are decoupled from the FIR adaptation controlled by the adapting module 150 which adapts the filter taps of FIR1 and FIR2. When the adapting module 150 is adapting the filter tap values of the first and second filters FIR1 130 and FIR2 132, the gains of the third and fourth multipliers 152 and 154 do not adapt.

Figure 2:
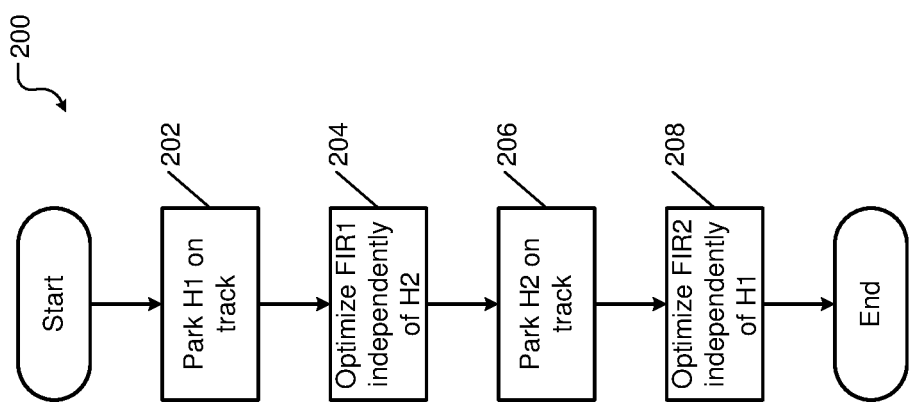
FIG. 2 shows a method for optimizing a finite impulse response (FIR) filter for a read head using the read channel module of FIG. 1B according to the present disclosure.

FIG. 2 shows a method 200 for optimizing an FIR filter for a read head independently of other heads according to the present disclosure. The method 200 is used with the HDD 100 utilizing the TDMR system. The read channel module 114 is used to perform the method 200 in the factory.

At 202, the read channel module 114 parks a first head (e.g., H1 118) on a track of the magnetic medium (e.g., element 112). At 204, the read channel module 114 determines optimal tap values for a first FIR filter (e.g., FIR1 130) associated with the first head (e.g., H1 118) independently of a second head (e.g., H2 120). At 206, the read channel module 114 parks the second head (e.g., H2 120) on a track of the magnetic medium (e.g., element 112). At 208, the read channel module 114 determines optimal tap values for a second FIR filter (e.g., FIR2 132) associated with the second head (e.g., H2 120) independently of the first head (e.g., H1 118).

Figure 3:
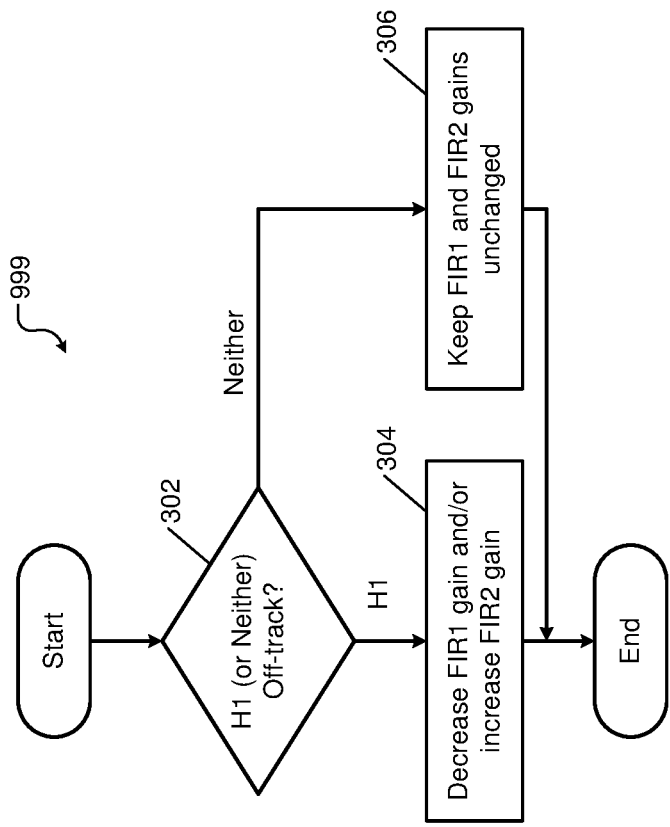
FIG. 3 shows a method for adjusting gains for FIR filters using the read channel module of FIG. 1B according to the present disclosure.

FIG. 3 shows a method 300 for adjusting gains associated with FIR filters depending on whether the respective heads are on track or off track according to the present disclosure. The method 300 is used with the HDD 100 utilizing the TDMR system. The read channel module 114 performs the method 300 during use or normal operation of the disk drive 100 (i.e., not in the factory).

At 302, the read channel module 114 determines if a first head (e.g., H1 118) of two heads (e.g., H1 118 and H2 120), for example, is off track or if none of the two heads (e.g., H1 118 and H2 120) is off track.

At 304, if the first head (e.g., H1 118) is off track, the read channel module 114 (e.g., the first gain control module 140 of the read channel module 114) decreases a gain (Gain 1) associated with a first FIR filter (e.g., FIR1 130) corresponding to the first head (e.g., H1 118). Additionally or alternatively, the read channel module 114 (e.g., the second gain control module 142 of the read channel module 114) may increase a gain (Gain 2) associated with a second FIR filter (e.g., FIR2 132) corresponding to a second head (e.g., H2 120), which is on track and not off track.

At 306, if none of the two heads (e.g., H1 118 and H2 120) is off track, the read channel module 114 (e.g., the first and second gain control modules 140, 142 of the read channel module 114) maintains the gains (Gain 1 and Gain 2) associated with the first and second FIR filters (e.g., FIR1 130 and FIR2 132) unchanged.

Figure 4:
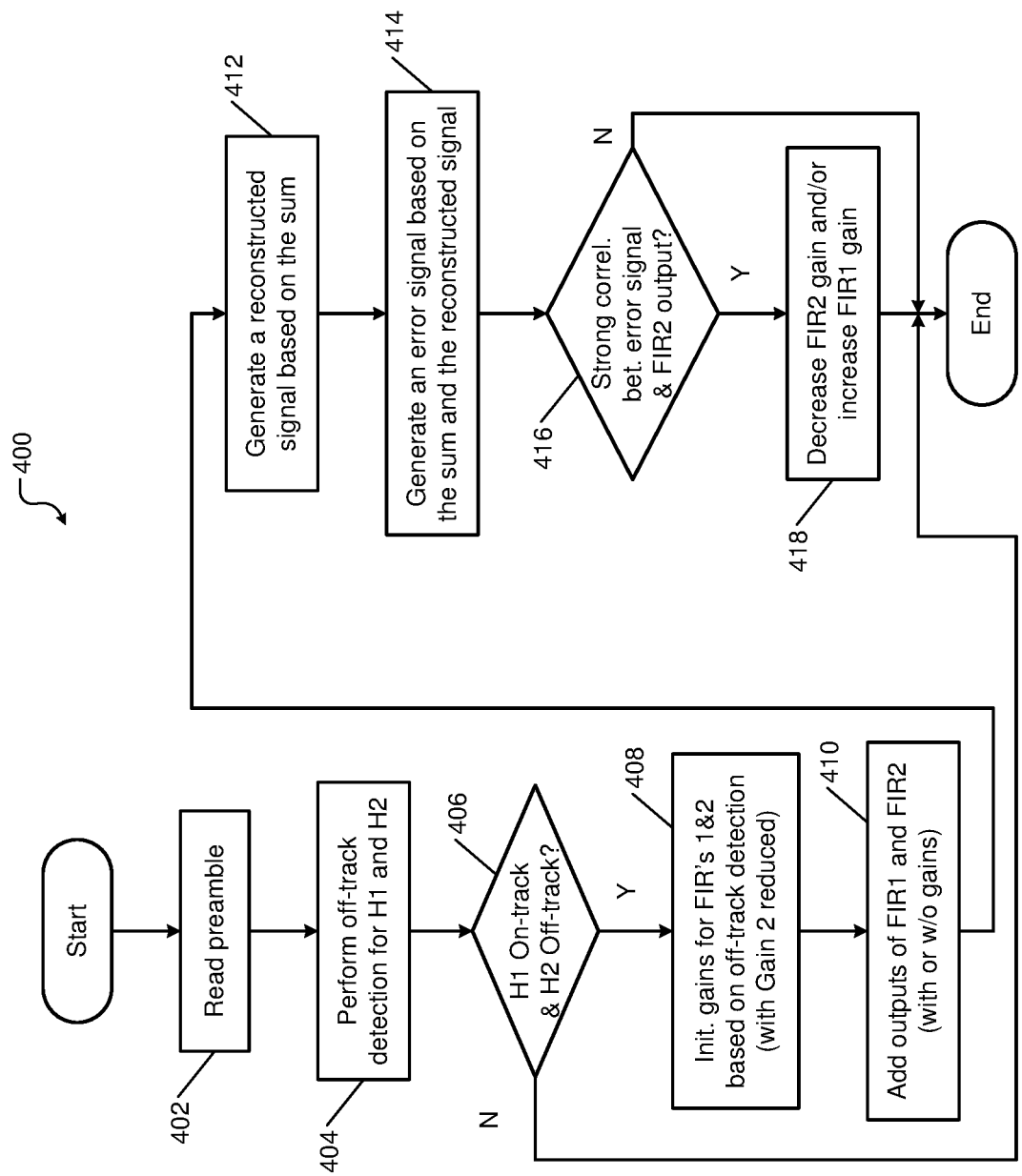
FIG. 4 shows a method for performing coarse and fine gain adjustments for FIR filters using the read channel module of FIG. 1B according to the present disclosure.

FIG. 4 shows a method 400 for performing coarse and fine gain adjustments for FIR filters depending on whether the corresponding heads are on track or off track according to the present disclosure. The method 400 is used with the HDD 100 utilizing the TDMR system. The read channel module 114 performs the method 400 during use or normal operation of the disk drive 100 (i.e., not in the factory).

At 402, the read channel module 114 reads a preamble of a read signal generated by a TDMR system comprising, for example, two heads (e.g., H1 118 and H2 120). At 404, the read channel module 114 (e.g., the off-track detector module 144 of the read channel module 114) performs off-track detection and off-track measurements for the two heads (e.g., H1 118 and H2 120). At 406, the read channel module 114 (e.g., the off-track detector module 144 of the read channel module 114) determines if one of the two heads (e.g., H1 118) is on track and the other head (e.g., H2 120) is off track.

At 408, if one of the two heads (e.g., H1 118) is on track and the other head (e.g., H2 120) is off track, the read channel module 114 (e.g., the first and second gain control modules 140, 142 of the read channel module 114) initializes the gains (Gain 1 and Gain 2) associated with the two FIR filters (e.g., FIR1 130 and FIR2 132) corresponding to the two heads (e.g., H1 118 and H2 120) according to the off track detection and measurements. That is, in this example, since the first head (e.g., H1 118) is on track and the second head (e.g., H2 120) is off track, the first gain control module 140 initializes the first gain (Gain 1) associated with the first FIR filter (e.g., FIR1 130) to a normal value G1 (computed based on signal amplitudes A1 and A2 as G1=A1/(A1+A2) as described above), and the second gain control module 142 initializes the second gain (Gain 2) associated with the second FIR filter (e.g., FIR2 132) to less than normal value G2 (computed based on signal amplitudes A1 and A2 as G2=A2/(A1+A2) as described above). In other words, the gain Gain 2 associated with the second FIR filter (e.g., FIR2 132) is reduced since the second head (e.g., H2 120) is off-track. This is the coarse adjustment of the gain Gain 2 associated with the second FIR filter (e.g., FIR2 132) and of the gain Gain 1 associated with the first FIR filter (e.g., FIR1 130).

At 410, the read channel module 114 (e.g., the adder 134 of the read channel module 114) adds the outputs of the first and second FIR filters (e.g., FIR1 130 and FIR2 132) with or without the respective gains (Gain 1 and Gain 2). At 412, the read channel module 114 (e.g., the reconstruction module 136 of the read channel module 114) generates a reconstructed signal based on the sum (i.e., output of adder 134). At 414, the read channel module 114 (e.g., the subtractor 138 of the read channel module 114) generates an error signal based on a difference between the reconstructed signal and the error signal.

At 416, the read channel module 114 (e.g., the second gain control module 142 of the read channel module 114) determines if there is a strong correlation between the error signal and the output of the second FIR filter (e.g., FIR2 130) since the second head (e.g., H2 120) is off track. At 418, if there is a strong correlation between the error signal and the output of the second FIR filter (e.g., FIR2 130), the read channel module 114 (e.g., the second gain control module 142 of the read channel module 114) decreases the gain Gain 2 associated with the second FIR filter (e.g., FIR2 132). Additionally or alternatively, the read channel module 114 (e.g., the first gain control module 140 of the read channel module 114) increases a gain (Gain 1) associated with the first FIR filter (e.g., FIR1 130) corresponding to the first head (e.g., H1 118), which is on track and not off track. This is the fine adjustment of the gain Gain 2 associated with the second FIR filter (e.g., FIR2 132) and of the gain Gain 1 associated with the first FIR filter (e.g., FIR1 130).

Figure 5:
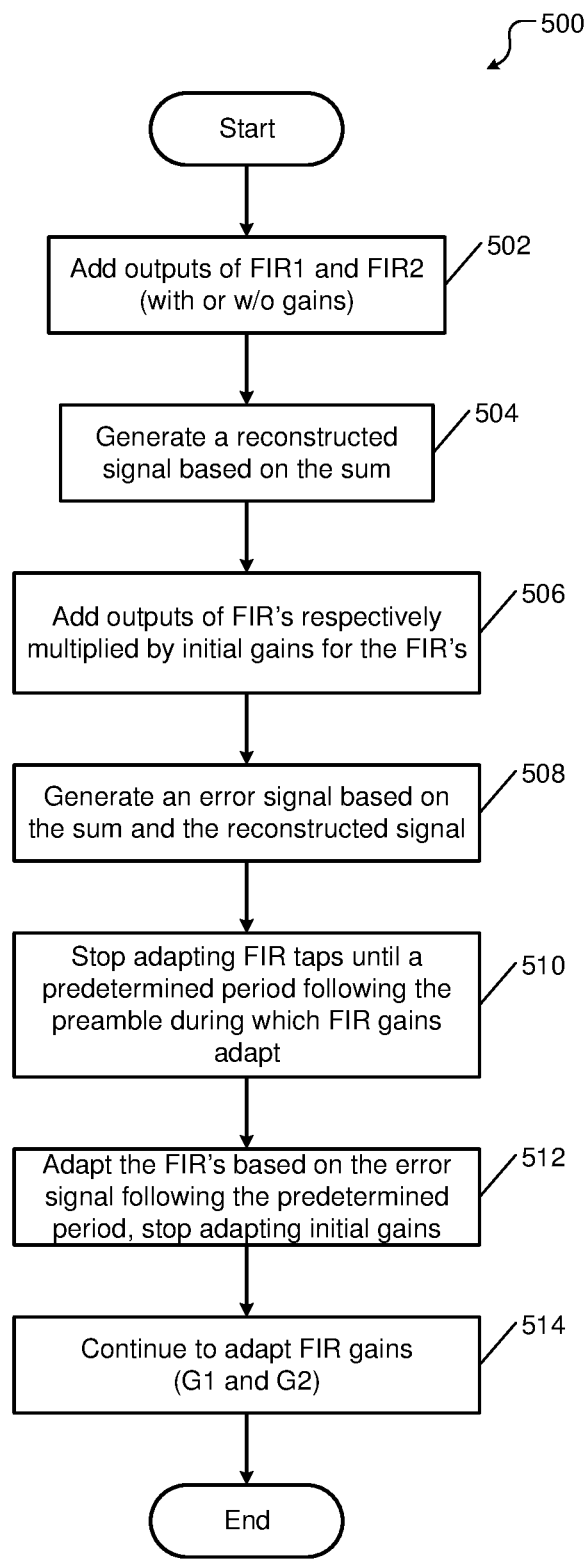
FIG. 5 shows a method for adapting tap values of FIR filters using the read channel module of FIG. 1B according to the present disclosure.

FIG. 5 shows a method 500 for adapting tap values of FIR filters at the end of a preamble of a data sector according to the present disclosure as described above. The method 500 is used with the HDD 100 utilizing the TDMR system. The read channel module 114 performs the method 500 during use or normal operation of the disk drive 100 (i.e., not in the factory).

At 502, the read channel module 114 (e.g., the adder 134 of the read channel module 114) adds the outputs of the first and second FIR filters (e.g., FIR1 130 and FIR2 132) with or without the respective gains (Gain 1 and Gain 2). At 504, the read channel module 114 (e.g., the reconstruction module 136 of the read channel module 114) generates a reconstructed signal based on the sum (i.e., the output of the adder 134).

At 506, the read channel module 114 (e.g., the adder 156 of the read channel module 114) adds the outputs of the first and second FIR filters (e.g., FIR1 130 and FIR2 132) with their respective initial gains. At 508, the read channel module 114 (e.g., the adder 156 of the read channel module 114) generates an error signal based on the difference between the sum (produced by the adder 156) and the reconstructed signal (produced by the reconstruction module 136).

At 510, the read channel module 114 (e.g., the adapting module 150 of the read channel module 114) stops adapting or does not adapt the taps of the first and second FIR filters (e.g., FIR1 130 and FIR2 132) based on the error signal (i.e., the output of the adder 156) for a predetermined period of time following a preamble portion of a data sector during which the read channel module 114 (e.g., the first and second gain control modules 140 and 142 of the read channel module 114) adapts/updates the gains of the first through fourth multipliers 146, 152, 148, 154.

At 512, at the end of the predetermined time period following the preamble the read channel module 114 (e.g., the adapting module 150 of the read channel module 114) starts adapting the taps of the first and second FIR filters (e.g., FIR1 130 and FIR2 132) based on the error signal (i.e., the output of the adder 156). At the end of the predetermined time period following the preamble, the read channel module 114 (e.g., the first and second gain control modules 140 and 142 of the read channel module 114) freezes (i.e. stops adapting) the gains of the third and fourth multipliers 152 and 154. At 514, the read channel module 114 (e.g., the first and second gain control modules 140 and 142 of the read channel module 114) continues to adapt the gains G1 and G2 of the first and second multipliers 146 and 148 as described above with reference to FIG. 1B.

Figure 6:
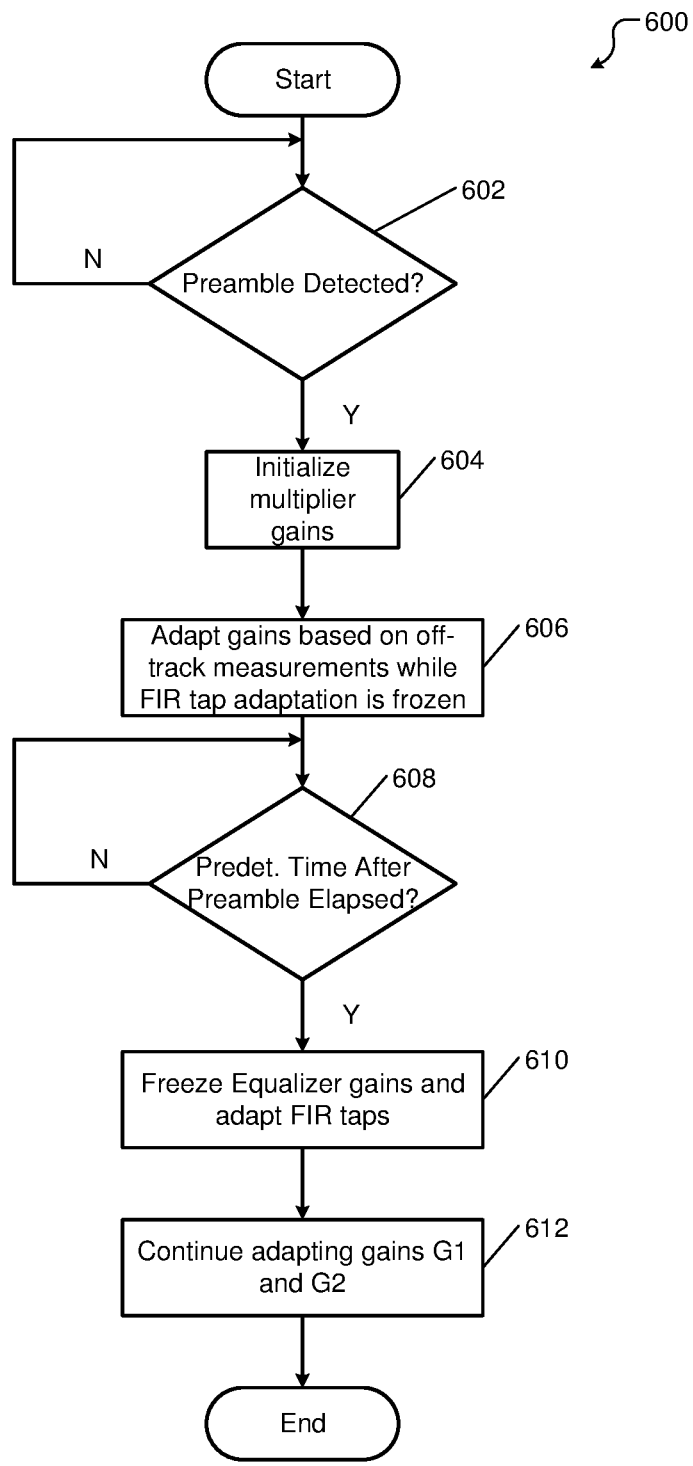
FIG. 6 shows a method for adjusting gains associated with FIR filters and adapting tap values of the FIR filters using the read channel module of FIG. 1B according to the present disclosure.

FIG. 6 shows a method 600 for adjusting gains associated with FIR filters and adapting tap values of the FIR filters according to the present disclosure. The method 600 is used with the HDD 100 utilizing the TDMR system. The read channel module 114 performs the method 600 during use or normal operation of the disk drive 100 (i.e., not in the factory).

At 602, the read channel module 114 determines if a preamble of a data sector being read is detected. At 604, if the preamble is detected, the read channel module 114 (e.g., the first and second gain control modules 140 and 142 of the read channel module 114) initialize the gains of the first through fourth multipliers 146, 152, 148, 154 associated with the first and second filters FIR1 130 and FIR2 132. At 606, during the preamble, the read channel module 114 (e.g., the first and second gain control modules 140 and 142 of the read channel module 114) adapts/updates the gains of the first through fourth multipliers 146, 152, 148, 154 while the adaptation of the tap values of the first and second filters FIR1 130 and FIR2 132 is frozen (i.e., stopped or not performed by the adapting module 150) throughout the preamble.

At 608, the read channel module 114 determines if a predetermined amount of time has elapsed following the end of the preamble. The gain adaptation ends at the end of the preamble, and waiting for the predetermined amount of time after the end of the preamble allows the gains to settle or stabilize. The time can also be dynamic, e.g., based on mean squared error of the error signal, or some other metric.

At 610, at the end of the predetermined amount of time following the end of the preamble, the read channel module 114 (e.g., the first and second gain control modules 140 and 142 of the read channel module 114) freezes (i.e., stops adapting) the gains (e.g., the gains of the third and fourth multipliers 152 and 154). Additionally, at the end of the predetermined amount of time following the end of the preamble, the read channel module 114 (e.g., the adapting module 150 of the read channel module 114) starts adapting the tap values of the first and second FIR filters FIR1 130 and FIR2 132.

At 612, the read channel module 114 (e.g., the first and second gain control modules 140 and 142 of the read channel module 114) continues to adapt the gains G1 and G2 of the first and second multipliers 146 and 148 associated with the first and second filters FIR1 130 and FIR2 132.

The above methods are described separately for simplicity and to clarify each feature of the present disclosure. The read channel module 114 can perform one or more of the methods concurrently and/or sequentially (i.e., the methods are not mutually exclusive).

Further, throughout the present disclosure, only two heads and corresponding circuitry of the read channel are shown for example only. In use, the TDMR system uses a plurality of heads. Accordingly, the principles and teachings of the present disclosure are not limited two heads but rather can be extended to a plurality of heads.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A two-dimensional magnetic recording (TDMR) system including a first read head and a second read head, each of the first read head and the second read head being configured to read data from one or more tracks of a magnetic medium, the TDMR system comprising:
   a first finite impulse response (FIR) filter configured to process data read from one of the one or more tracks of the magnetic medium by the first read head using first filter tap values, wherein the first filter tap values are determined a priori independently of the second read head and based on the first read head being positioned on one of the one or more tracks of the magnetic medium;
   a second FIR filter configured to process data read from one of the one or more tracks of the magnetic medium by the second read head using second filter tap values, wherein the second filter tap values are determined a priori independently of the first read head and based on the second read head being positioned on one of the one or more tracks of the magnetic medium;
   an off-track detector configured to detect whether one or more of the first read head and the second read head is off one of the one or more tracks being read; and
   a gain controller configured to control a first gain and a second gain respectively associated with the first FIR filter and the second FIR filter based on whether one or more of the first read head and the second read head is off one of the one or more tracks being read.

2. The TDMR system of claim 1, wherein in response to the first read head being more off one of the one or more tracks being read than the second read head, the gain controller is configured to:
   decrease the first gain associated with the first FIR filter relative to the second gain associated with the second FIR filter;
   increase the second gain associated with the second FIR filter relative to the first gain associated with the first FIR filter; or
   decrease the first gain associated with the first FIR filter and increase the second gain associated with the second FIR filter.

3. The TDMR system of claim 1, wherein the gain controller is configured to not change the first gain and the second gain respectively associated with the first FIR filter and the second FIR filter in response to each of the first read head and the second read head being on one of the one or more tracks being read or being equally off one of the one or more tracks being read.

4. The TDMR system of claim 1, wherein the gain controller is configured to:

initialize the first gain and the second gain respectively associated with the first FIR filter and the second FIR filter to be equal; and not change the first gain and the second gain respectively associated with the first FIR filter and the second FIR filter in response to each of the first read head and the second read head being on one of the one or more tracks being read or being equally off one of the one or more tracks being read.

5. The TDMR system of claim 1, wherein the off-track detector is configured to detect whether one or more of the first read head and the second read head is off or on one of the one or more tracks being read based on ratios of amplitudes of signals received from the first read head and the second read head.

6. The TDMR system of claim 1, further comprising:

an adder configured to generate a sum of outputs of the first FIR filter and the second FIR filter;

a reconstruction module configured to generate a reconstructed signal representing data read from one of the one or more tracks; and a subtractor configured to subtract the reconstructed signal from the sum and to generate an error signal, wherein the gain controller is configured to control the first gain and the second gain respectively associated with the first FIR filter and the second FIR filter based on correlations between the error signal and the outputs of the first FIR filter and the second FIR filter.

7. The TDMR system of claim 6, wherein the gain controller is configured to:

decrease the first gain associated with the first FIR filter in response to the error signal correlating with the output of the first FIR filter and not correlating with the output of the second FIR filter; and decrease the second gain associated with the second FIR filter in response to the error signal correlating with the output of the second FIR filter and not correlating with the output of the first FIR filter.

8. The TDMR system of claim 1, further comprising:

a first adder configured to generate a sum of outputs of the first FIR filter and the second FIR filter;

a reconstruction module configured to detect data in the sum and generate a reconstructed signal representing data read from one of the one or more tracks based on the detected data and a target polynomial;

a second adder configured to add the outputs of the first FIR filter and the second FIR filter respectively multiplied by a third gain and a fourth gain and to generate an output;

a subtractor configured to subtract the reconstructed signal from the output of the second adder and to generate an error signal; and an adapting module configured to adapt the first filter tap values of the first FIR filter and the second filter tap values of the second FIR filter based on the error signal.

9. The TDMR system of claim 8, wherein the adapting module is configured to:

not adapt the first filter tap values of the first FIR filter and the second filter tap values of the second FIR filter from the start of a preamble of a data sector of one of the one or more tracks being read until a predetermined time period elapses following the end of the preamble; and start adapting the first filter tap values of the first FIR filter and the second filter tap values of the second FIR filter based on the error signal after the predetermined time period elapses following the end of the preamble of the data sector, wherein the predetermined time period is programmable or is based on detecting when the third gain and the fourth gain stabilize.

10. The TDMR system of claim 9, wherein the gain controller is configured to:

adapt the first gain, the second gain, the third gain, and the fourth gain during the preamble;

stop adapting the third gain and the fourth gain after the end of the preamble; and continue adapting the first gain and the second gain after the first filter tap values of the first FIR filter and the second filter tap values of the second FIR filter are adapted.

11. A method for controlling a first finite impulse response (FIR) filter and a second FIR filter in a two-dimensional magnetic recording (TDMR) system, the TDMR system including a first read head and a second read head, each of the first read head and the second read head being configured to read data from one or more tracks of a magnetic medium, the method comprising:

processing, using the first FIR filter, data read from one of the one or more tracks of the magnetic medium by the first read head using first filter tap values, wherein the first filter tap values are determined a priori independently of the second read head and based on the first read head being positioned on one of the one or more tracks of the magnetic medium;

processing, using the second FIR filter, data read from one of the one or more tracks of the magnetic medium by the second read head using second filter tap values, wherein the second filter tap values are determined a priori independently of the first read head and based on the second read head being positioned on one of the one or more tracks of the magnetic medium;

detecting whether one or more of the first read head and the second read head is off one of the one or more tracks being read; and controlling a first gain and a second gain respectively associated with the first FIR filter and the second FIR filter based on whether one or more of the first read head and the second read head is off one of the one or more tracks being read.

12. The method of claim 11, in response to the first read head being more off one of the one or more tracks being read than the second read head, the method further comprising:

decreasing the first gain associated with the first FIR filter relative to the second gain associated with the second FIR filter;

increasing the second gain associated with the second FIR filter relative to the first gain associated with the first FIR filter; or decreasing the first gain associated with the first FIR filter and increasing the second gain associated with the second FIR filter.

13. The method of claim 11, further comprising not changing the first gain and the second gain respectively associated with the first FIR filter and the second FIR filter in response to each of the first read head and the second read head being on one of the one or more tracks being read or being equally off one of the one or more tracks being read.

14. The method of claim 11, further comprising:

initializing the first gain and the second gain respectively associated with the first FIR filter and the second FIR filter to be equal; and not changing the first gain and the second gain respectively associated with the first FIR filter and the second FIR filter in response to each of the first read head and the second read head being on one of the one or more tracks being read or being equally off one of the one or more tracks being read.

15. The method of claim 11, further comprising detecting whether one or more of the first read head and the second read head is off or on one of the one or more tracks being read based on ratios of amplitudes of signals received from the first read head and the second read head.

16. The method of claim 11, further comprising:
generating a sum of outputs of the first FIR filter and the second FIR filter;
generating a reconstructed signal representing data read from one of the one or more tracks;
subtracting the reconstructed signal from the sum to generate an error signal; and
controlling the first gain and the second gain respectively associated with the first FIR filter and the second FIR filter based on correlations between the error signal and the outputs of the first FIR filter and the second FIR filter.

17. The method of claim 16, further comprising:
decreasing the first gain associated with the first FIR filter in response to the error signal correlating with the output of the first FIR filter and not correlating with the output of the second FIR filter; and
decreasing the second gain associated with the second FIR filter in response to the error signal correlating with the output of the second FIR filter and not correlating with the output of the first FIR filter.

18. The method of claim 11, further comprising:
generating a sum of outputs of the first FIR filter and the second FIR filter;
detecting data in the sum and generating a reconstructed signal representing data read from one of the one or more tracks based on the detected data and a target polynomial;
adding the outputs of the first FIR filter and the second FIR filter respectively multiplied by a third gain and a fourth gain and generating an output;
subtracting the reconstructed signal from the output and generating an error signal; and
adapting the first filter tap values of the first FIR filter and the second filter tap values of the second FIR filter based on the error signal.

19. The method of claim 18, further comprising:
not adapting the first filter tap values of the first FIR filter and the second filter tap values of the second FIR filter from the start of a preamble of a data sector of one of the one or more tracks being read until a predetermined time period elapses following the end of the preamble; and
starting adapting the first filter tap values of the first FIR filter and the second filter tap values of the second FIR filter based on the error signal after the predetermined time period elapses following the end of the preamble of the data sector,
wherein the predetermined time period is programmable or is based on detecting when the third gain and the fourth gain stabilize.

20. The method of claim 19, further comprising:
adapting the first gain, the second gain, the third gain, and the fourth gain during the preamble;
stopping adapting the third gain and the fourth gain after the end of the preamble; and
continuing adapting the first gain and the second gain after the first filter tap values of the first FIR filter and the second filter tap values of the second FIR filter are adapted.

* * * * *

UNITED STATES PATENT AND TRADEMARK OFFICE
CERTIFICATE OF CORRECTION

| | | |
|---|---|---|
| PATENT NO. | : 10,529,376 B1 | Page 1 of 1 |
| APPLICATION NO. | : 16/182160 | |
| DATED | : January 7, 2020 | |
| INVENTOR(S) | : Mats Oberg | |

It is certified that error appears in the above-identified patent and that said Letters Patent is hereby corrected as shown below:

On the Title Page

Item number (73) Assignee:   Delete "MARVEL" and insert --MARVELL--

Signed and Sealed this
Eighteenth Day of February, 2020

Andrei Iancu
*Director of the United States Patent and Trademark Office*